United States Patent
Huh et al.

(10) Patent No.: US 9,294,489 B2
(45) Date of Patent: Mar. 22, 2016

(54) METHOD AND APPARATUS FOR DETECTING AN INTRUSION ON A CLOUD COMPUTING SERVICE

(71) Applicant: INTELLECTUAL DISCOVERY CO., LTD., Seoul (KR)

(72) Inventors: Eui Nam Huh, Seoul (KR); Sang Ho Na, Yongin-si (KR); Jun Young Park, Yongin-si (KR); Jin Taek Kim, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 62 days.

(21) Appl. No.: 14/345,196

(22) PCT Filed: Sep. 26, 2012

(86) PCT No.: PCT/KR2012/007754
§ 371 (c)(1),
(2) Date: Mar. 14, 2014

(87) PCT Pub. No.: WO2013/048111
PCT Pub. Date: Apr. 4, 2013

(65) Prior Publication Data
US 2014/0344933 A1 Nov. 20, 2014

(30) Foreign Application Priority Data
Sep. 26, 2011 (KR) .................. 10-2011-0097068
Dec. 5, 2011 (KR) .................. 10-2011-0129243

(51) Int. Cl.
*H04L 29/06* (2006.01)
*G06F 21/55* (2013.01)
*G06F 11/00* (2006.01)

(52) U.S. Cl.
CPC ............ *H04L 63/1416* (2013.01); *G06F 21/55* (2013.01); *H04L 63/0428* (2013.01); *H04L 63/1408* (2013.01); *H04L 67/42* (2013.01)

(58) Field of Classification Search
CPC . H04L 63/14; H04L 63/1408; H04L 63/1416; H04L 63/1425; H04L 63/1441; H04L 63/1458; H04L 63/0428; H04L 67/42; G06F 21/55; G06F 21/552; G06F 21/554
See application file for complete search history.

(56) References Cited

U.S. PATENT DOCUMENTS 8,042,178 B1 * 10/2011 Fisher .................. G06F 21/554
726/22
2002/0143963 A1 * 10/2002 Converse et al. ............. 709/229
(Continued)

FOREIGN PATENT DOCUMENTS

KR 10-2009-0106197 A 10/2009
KR 10-0942456 B1 2/2010
(Continued)

*Primary Examiner* — Darren B Schwartz
(74) *Attorney, Agent, or Firm* — Rothwell, Figg, Ernst & Manbeck, P.C.

(57) ABSTRACT

Provided is a method and apparatus for detecting an intrusion in a cloud computing service. An elementary detector may monitor a virtual machine provided by a cloud computing service, and may generate a raw alert based on a result of the monitoring. An intrusion detection system (IDS) dispatcher may determine occurrence of an intrusion into the cloud computing service by comparing the raw alert and a local database. The IDS dispatcher may generate a hyper alert when it is determined that the intrusion has occurred. An intrusion detection system (IDS) manager may determine the occurrence of the intrusion by comparing the hyper alert and a global database.

18 Claims, 5 Drawing Sheets

(56) References Cited

U.S. PATENT DOCUMENTS

| | | | |
|---|---|---|---|
| 2004/0015719 A1* | 1/2004 | Lee | H04L 63/1416 726/23 |
| 2006/0150248 A1* | 7/2006 | Ross | G06F 21/554 726/22 |
| 2006/0265746 A1* | 11/2006 | Farley et al. | 726/22 |
| 2007/0130327 A1* | 6/2007 | Kuo et al. | 709/224 |
| 2007/0266433 A1* | 11/2007 | Moore | 726/15 |
| 2008/0235769 A1* | 9/2008 | Purcell | H04L 63/1416 726/3 |
| 2008/0320594 A1* | 12/2008 | Jiang | G06F 21/566 726/24 |
| 2009/0044265 A1* | 2/2009 | Ghosh | G06F 21/552 726/14 |
| 2009/0077632 A1* | 3/2009 | Carpenter | H04L 63/1441 726/3 |
| 2009/0119740 A1* | 5/2009 | Alperovitch et al. | 726/1 |
| 2011/0004935 A1* | 1/2011 | Moffie et al. | 726/23 |
| 2011/0023114 A1* | 1/2011 | Diab | H04L 63/1441 726/22 |
| 2011/0173699 A1* | 7/2011 | Figlin et al. | 726/23 |
| 2012/0233698 A1* | 9/2012 | Watters et al. | 726/25 |
| 2012/0331127 A1* | 12/2012 | Wang et al. | 709/224 |

FOREIGN PATENT DOCUMENTS

| | | |
|---|---|---|
| KR | 10-2011-0051028 A | 5/2011 |
| KR | 10-2011-0068308 A | 6/2011 |
| KR | 10-1059199 B1 | 8/2011 |

* cited by examiner

METHOD AND APPARATUS FOR DETECTING AN INTRUSION ON A CLOUD COMPUTING SERVICE

CROSS REFERENCE TO RELATED APPLICATIONS

This application is a 35 U.S.C. §371 National Phase Entry Application from PCT/KR2012/007754, filed Sep. 26, 2012, and designating the United States, which claims priority under 35 U.S.C. §119 to Korean Patent Application No. 10-2011-0097068 filed Sep. 26, 2011 and to Korean Patent Application No. 10-2011-0129243 filed Dec. 5, 2011, which are incorporated herein in their entireties.

TECHNICAL FIELD

The present invention relates to a method and apparatus for providing a cloud computing service, and more particularly, to a method and apparatus that may detect, in real time, an unauthorized intrusion action occurring in a network or a computer system of a cloud computing service.

BACKGROUND ART

Cloud computing refers to technology of providing a large scale of information technology (IT) resources using virtualization technology and distributed processing technology. Using a cloud computing service, a user may be provided with a service with respect to computing resources through the Internet. Computing resources may include a memory resource, a central processing unit (CPU) resource, a network resource, a storage resource, and the like. The user may pay an entity operating the cloud computing service a fee corresponding to an amount of computing resources used by the user.

Specifically, cloud computing refers to technology of integrating, into a single computing resource through virtualization technology, computing resources that are present at physically different positions, and providing the integrated computing resource to users. For example, cloud computing may be regarded as an "Internet based and user centered on-demand outsourcing service technology".

When the Internet is provided, the user may use a computing environment of the user through the cloud computing service without restrictions on a time and an occasion. The cloud computing service charges the user with a fee corresponding to an amount of resources used by the user. Also, through a computing environment of the cloud computing service, the user may be provided with all of the services such as a hardware service, a software service, an after service (AS), and the like. Accordingly, costs for maintaining and repairing a system may be reduced, costs for purchasing software may be reduced, and an amount of energy used for computing processing may be reduced.

With the increasing attention to the cloud computing service, the cloud computing service has been widely distributed under the lead of major IT companies. The cloud computing service includes four cloud computing service types, such as a public cloud service, a private cloud service, and the like.

The public cloud service may provide a cloud service to many and unspecified users through the Internet. The public cloud service indicates neither providing of a free service nor opening of data and a source associated with a service. The public cloud service may also provide a service using a user access control, charge, and the like. In the public cloud service, a service provider may manage user information and the resources of the cloud computing service may be shared. Accordingly, the public cloud service may have a weakness in protecting personal information of a user.

The private cloud service may provide the same computing environment as in the public cloud service. The private cloud service indicates a cloud service that enables a predetermined company or institution to directly manage a cloud computing service, data, and process. Specifically, the private cloud service may be a closed cloud service type that avoids an external access and allows access of only authorized users for security.

A communication cloud service refers to a cloud computing service for a group of predetermined users. The communication cloud service may assign an access right only to members of a predetermined group. Members of a group may share data, an application, and the like through the communication cloud service.

A hybrid cloud service refers to a service in which the public cloud service and the private cloud service are combined. The hybrid cloud service may basically provide the public cloud service and may follow a policy of the private cloud service with respect to data and a service that a user does not desire to share.

A structure of the cloud computing service may be classified into an infra-type service structure, a platform-type service structure, and a software service structure. The infra-type service structure may provide a user-tailored computing environment based on requirements of a user. The platform-type service structure may provide an environment in which a user may select and use a platform suitable for a computing purpose of the user. The software service structure may provide an environment in which a user may select and use software suitable for a usage purpose.

Intrusion detection is a process of analyzing an intrusion attack signal occurring in a computer system or a network. The intrusion attack signal may include traffic overload, right extortion, and the like.

An intrusion may occur due to a variety of reasons, for example, a malicious code. For example, an attacker may make an unauthorized access through the Internet. Also, an authorized user may abuse the right and may attempt to extort the right. Even though some intrusions may be malicious, many intrusions may not be malicious. For example, a user may erroneously input a computer address. Due to the erroneously input computer address, connection from another system to which the user has no right may be attempted.

An intrusion detection system may automatically perform a detection process with respect to the aforementioned intrusion. The intrusion detection system is a system of detecting an intrusion action in real time by analyzing a signal that threatens a computing resource. The intrusion detection system may monitor an event occurring in a computer system or a network in order to analyze the signal. The intrusion detection system may analyze the signal based on a security policy, known intrusion cases, and the like.

The intrusion detection system may be classified into two types. The two types may include a network-based intrusion detection system (NIDS) and a host-based intrusion detection system (HIDS).

The NIDS may be operated as a single independent system on a network. The NIDS has advantages in that network resources are not lost and data modulation does not occur in monitoring. Also, the NIDS may monitor and inspect traffic with respect to the overall network. The NIDS has disadvantages in that an error detection rate is high and many packets are not detected in a network having high traffic.

The HIDS may be additionally installed in an operating system (OS) of a computer system, or may be installed in a general client and thereby be operated. The HIDS may collect and analyze data such as system call, application log, file system correction, activity of another host associated with a host, a state of the other host, and the like. Using the above collection and analysis, intrusion detection may be performed. The HIDS may not perform intrusion detection with respect to the overall network. Also, the HIDS is positioned within a host and thus, may become a target of an intrusion attack together with the host.

An intrusion detection scheme may be classified into a misuse detection scheme and an anomaly detection scheme.

In the misuse detection scheme, a currently occurring signal such as log information or a packet is compared with a signal list through a character string comparison operation. The misuse detection scheme may detect an intrusion through the above comparison and thus, be very effective in detecting a known threat. However, the misuse detection scheme may be ineffective in detecting a previously unknown threat, a disguised threat using avoidance technology, and a deformed threat.

In various networks and various types of program applications, the range in which a signal-based detection scheme such as the misuse detection scheme is available may be relatively narrow. Also, in complex communication, the signal-based detection scheme may be unsuitable for attack detection. As described above, the misuse detection scheme may perform intrusion detection through pattern comparison of applying a known attack pattern. Accordingly, the misuse detection scheme is vulnerable to a new attack pattern not included in known attack patterns and needs to continuously update the new attack pattern.

The anomaly detection scheme defines general traffic and signal, and designates a deviation with respect to the general traffic and signal. The anomaly detection scheme is a process of detecting an attack when traffic and a signal are deviated from the range of the deviation. The intrusion detection system using the anomaly detection scheme may define a normal action of a target to be detected, such as a user, a host, a network connection, an application, and the like, and may set the allowable range with respect to an action of the target to be detected. The allowable range may be normal range of the action of the target to be detected. The anomaly detection scheme may recognize that an attack has occurred when the action of the target to be detected is deviated from the allowable range based on a predetermined time unit. The recognized attack may be notified to a manager.

The anomaly detection scheme may compare a current activity and a general activity of the target to be detected using a statistical method. When anomaly is detected as the comparison result, the anomaly detection scheme may notify the manager that the anomaly is detected. For example, the detected anomaly may correspond to a case that the target to be detected uses a bandwidth beyond the allowable range. The anomaly detection scheme may set the allowable range based on an action attribute such as the number of e-mails transmitted from a user, the number of times that the user has failed to log in, an amount of processor usage of a host that the user has used during a predetermined period of time, and the like. Here, the predetermined period of time may be a day unit, a week unit, and the like. The anomaly detection scheme may be very effective in detecting a threat not known yet.

A training period is a predetermined period of time used to set a threshold. In the anomaly detection scheme, setting of the threshold may be fixed or flexible. In fixed setting of a threshold, the threshold does not change unless the intrusion detection system sets a new threshold. In flexible setting of a threshold g, the threshold is seamlessly adjusted every time an additional event occurs in the intrusion detection system. In the anomaly detection scheme, an intrusion attack within the threshold frequently occurs. Also, detailed setting of a threshold may give great burden to computing activities and may also degrade computing performance.

For example, when a predetermined maintenance activity that requires transmission of a large file occurs only once per month, the maintenance activity may not appear during the training period. However, when the maintenance activity frequently occurs, the anomaly detection scheme may regard the maintenance activity as an intrusion and trigger an alert.

In a flexible environment, a normal activity that exceeds the threshold may be present. Accordingly, the anomaly detection scheme may make a false positive decision. As for another noticeable issue in using the anomaly detection scheme, when a large amount of complex traffic occurs, it may be verify difficult to make a correct analysis and decision about intrusion detection using the anomaly detection scheme.

Even though the aforementioned NIDS and HIDS are intrusion detection systems that are widely used in the existing Internet environment, the NIDS and the HIDS may be unsuitable for a cloud environment.

The NIDS is positioned within a network to provide traffic analysis and monitoring with respect to the overall network in which the NIDS is positioned.

However, a cloud computing service may also form a virtual network within a cloud computing system using virtualization technology. The NIDS may not consider an intrusion between internal virtual machines, an intrusion between cloud computing service providers, and the like. Accordingly, the NIDS may be unsuitable for the cloud environment.

The HIDS is positioned in each host to perform inspection about log information of a host, inspection of an application executed in the host, monitoring of communication with another host, and the like. Inspection and monitoring of the HIDS may be independently performed for each host. Accordingly, the HIDS may be vulnerable to a large scale of intrusion attack or a joint attack.

Accordingly, there is a desire for a new intrusion detection system suitable for a cloud environment.

DISCLOSURE OF INVENTION

Technical Goals

An aspect of the present invention provides an intrusion detection method and apparatus suitable for a cloud environment using a network-based intrusion detection system (NIDS) and a host-based intrusion detection system (HIDS).

An aspect of the present invention also provides a method and apparatus for an authentication between nodes that may prevent degradation in performance of an intrusion detection system and occurrence of an attack against the intrusion detection system.

An aspect of the present invention also provides an encryption method and apparatus that may prevent degradation in performance of an intrusion detection system and occurrence of an attack against the intrusion detection system.

Technical solutions

According to an aspect, there is provided an intrusion detection system of a cloud computing service, the system including: an elementary detector to monitor a virtual machine provided by the cloud computing service, and to generate a raw alert based on a result of the monitoring; and an intrusion detection system (IDS) dispatcher to determine occurrence of an intrusion into the cloud computing service based on the raw alert.

The elementary detector may generate the raw alert when a traffic value of the virtual machines exceeds a threshold.

The threshold may be limited to be within a constraint range that is set as a range that a service provider of the cloud computing service is capable of providing a user of the virtual machine.

The raw alert may include a supercritical value and a state value of the virtual machine, and the supercritical value may indicate a level at which a traffic value of the virtual machine exceeds a threshold.

The IDS dispatcher may determine the occurrence of the intrusion by comparing the raw alert with a blacklist.

The blacklist may be stored in a local database of the IDS dispatcher.

The blacklist may include a known attack pattern and an attack pattern prepared by a manager.

The IDS dispatcher may generate the elementary detector that is configured for each virtual machine.

The elementary detector may use an anomaly detection scheme.

A plurality of virtual machines and a plurality of elementary detectors may be provided, and the IDS dispatcher may receive the raw alert from the plurality of elementary detectors.

The intrusion detection system may further include an intrusion detection system (IDS) manager to determine the occurrence of the intrusion based on a hyper alert. The IDS dispatcher may generate the hyper alert by correlating intrusion information and a state value of the virtual machine with the raw alert.

The intrusion information may include a location at which an attack against the virtual machine has occurred and a pattern of the attack.

The IDS manager may determine that the intrusion has occurred when the hyper alert is similar or identical to a blacklist.

According to another aspect, there is provided an intrusion detection method of a cloud computing service, the method including: generating a raw alert based on a result of monitoring a virtual machine provided by the cloud computing service; and determining occurrence of an intrusion into the cloud computing service based on the raw alert.

The intrusion detection method may further include determining the occurrence of the intrusion based on a hyper alert.

Effect of the Invention

According to embodiments, there is provided a method and apparatus that may detect an intrusion between internal virtual machines and an intrusion between cloud service providers, and may also detect a large scale of intrusion attack or joint attack According to embodiments, there is provided a method and apparatus for an authentication between nodes that may prevent degradation in performance of an intrusion detection system and occurrence of an attack against the intrusion detection system.

According to embodiments, there is provided an encryption method and apparatus that may prevent degradation in performance of an intrusion detection system and occurrence of an attack against the intrusion detection system.

BEST MODE FOR CARRYING OUT THE INVENTION

Figure 1:
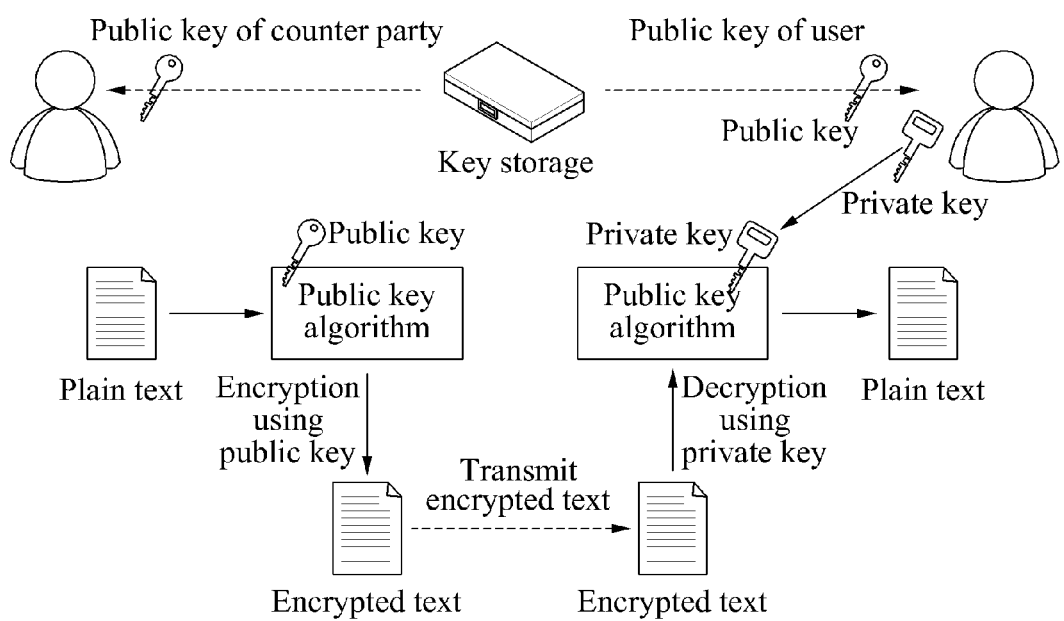
FIG. 1 is a diagram to describe a public key based encryption process.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram to describe a public key based encryption process.

Symmetric key based encryption may be an encryption scheme using an identical key for encryption and decryption.

A key used for the symmetric key based encryption may be a private key. Users that perform encryption and decryption may share an identical private key. Encryption and decryption of a message may be performed using a private key shared between users. For example, a message encrypted using a private key may not be decrypted without using the identical private key.

Technology associated with the private key based encryption may include a scheme based on a master key, a scheme based on a pair-wise key, a scheme based on pre-distribution of a random key, and the like.

Public key based encryption may be an encryption scheme in which a public key for encrypting a message and a private key for decrypting the encrypted message are separately present.

In general, a public key of a user may be known to everyone. For example, the user may provide the public key of the user and a public key of a counter party from a public key storage.

A private key of the user may be known only to the user. A transmitter of a message may encrypt a plain text of a message using a public key of a receiver of the message, and may transmit the encrypted text of the message to the receiver. The receiver may receive the message and may obtain the original text by decrypting the encrypted text using a private key of the receiver. A public key algorithm may be used for the above encryption and decryption.

Public key based encryption may require a relatively large amount of memory and operation capability compared to the symmetric key based encryption. Also, in the public key based encryption, public keys of the respective users may need to be authenticated in advance.

Figure 2:
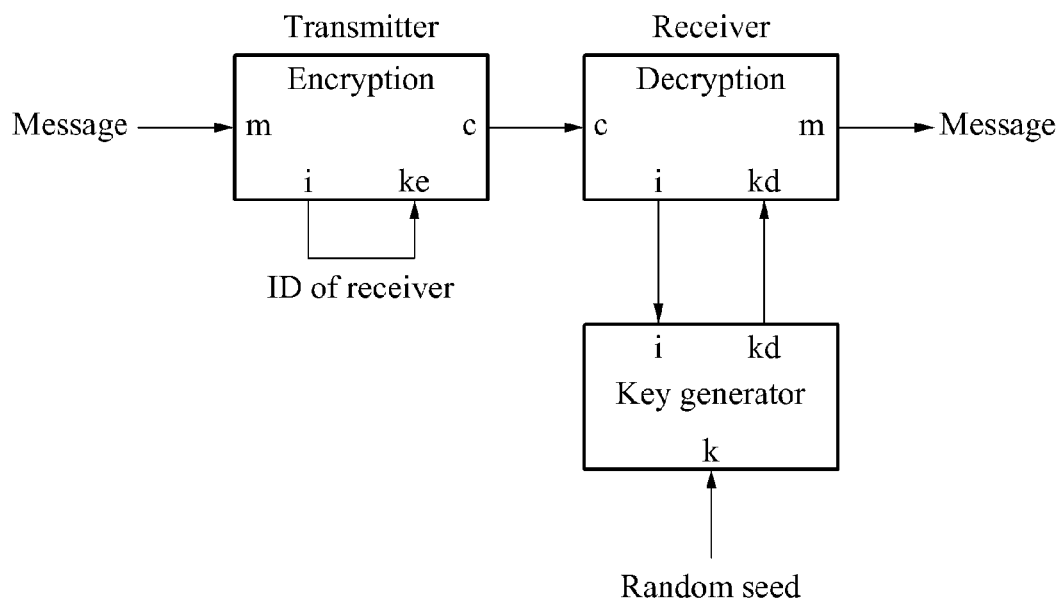
FIG. 2 is a diagram to describe an identifier (ID) based encryption method.

Hereinafter, identity based encryption (IBE) will be described with reference to FIG. 2 and FIG. 3. The IBE may not require pre-distribution of a key and thus, may use a relatively small amount of calculation. Also, the IBE may have a further excellent characteristic in an execution time and a memory usage amount compared to other encryption algorithms of the same security level.

An identifier (ID) based encryption method will be described with reference to FIG. 2.

A transmitter may encrypt a message using a public ID of a receiver. For example, an ID of the receiver may be used as a public key of the receiver.

An encryption key ke may be generated based on an ID i of the receiver. The ID i of the receiver may be used as the public key of the receiver. The encryption key ke may be the ID i of the receiver.

On a transmitter side, a message m may be converted to an encrypted text c through encryption using the encryption key ke. The encrypted text c may be generated based on the encryption key ke and the ID i of the receiver. The encrypted text c may be transferred from the transmitter to the receiver.

The receiver may receive a decryption key kd from a key generator. To receive the decryption key kd, authentication of the receiver may be required. For authenticating the receiver, the receiver may transmit the ID i of the receiver to the key generator. The key generator may authenticate the user using the ID i of the receiver. When the receiver is authenticated, the key generator may transmit the decryption key kd to the receiver.

On a receiver side, the encrypted text c may be converted to the message m through decryption using the decryption key kd. The message m may be generated based on the decryption key kd.

The encryption key ke and the decryption key kd may be selected based on a random seed k. The decryption key kd may be generated the ID i of the receiver and the random seed k.

The key generator may be regarded to perform the most important role in an IBE and thus, need to be reliable. Accordingly, the key generator may be managed by a reliable third party. When the key generator is threatened, the IBE may become unreliable.

Figure 3:
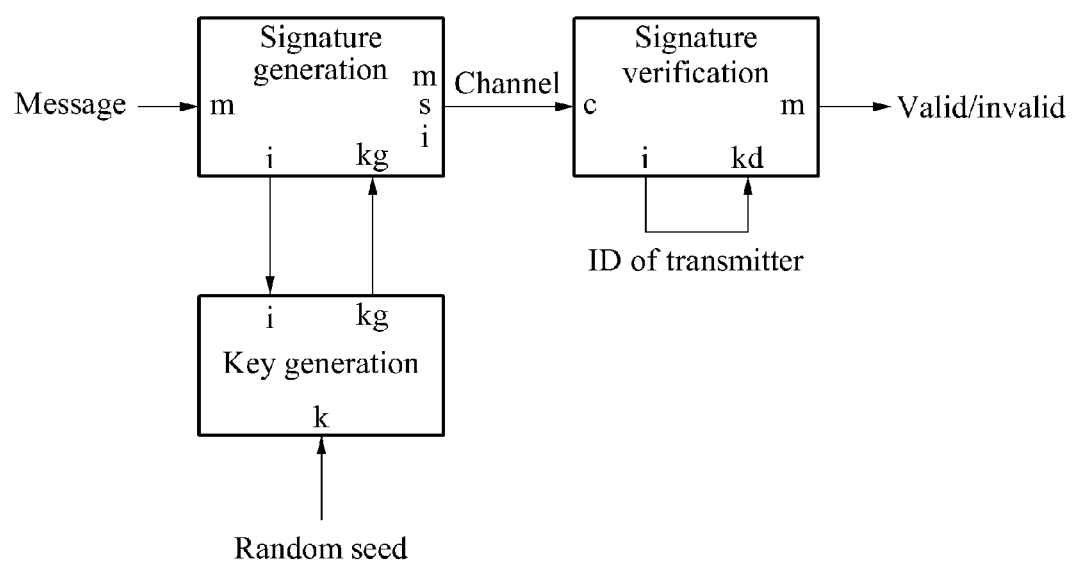
FIG. 3 is a diagram to describe an ID based authentication method.

FIG. 3 is a diagram to describe an ID based authentication method.

The ID based authentication method may be performed in an inverse order of the ID based encryption method described above with reference to FIG. 2.

On a transmitter side, a message m may be encrypted to msi through signature generation using a signature key kg. Here, msi may denote a message and signature, and kg may denote a private key. The above encryption may be performed for authentication.

A transmitter may transmit an ID i of the transmitter to a key generator in order to obtain the signature key kg. The signature key kg may be generated based on an ID i of a transmitter and a random seed k. The key generator may transmit the generated signature key kg to the transmitter.

The transmitter may transmit mis through a channel. A receiver may receive msi through the channel. The transmitted msi may be an encrypted text c. The receiver may verify that msi is transmitted from the transmitter by verifying the signature using the decryption key kd. The receiver may obtain the message m by decrypting the encrypted text c using a decryption key kd.

The decryption key kd may be generated based on the ID i of the transmitter. The ID i of the transmitter may be public. For example, the ID i of the transmitter may be used as a public key of the transmitter. The public key kd may be the ID i of the transmitter.

Based on the above verification, the receiver may determine whether msi is valid or invalid. When a valid message is generated by decryption, the receiver may determine that msi is valid. That msi is valid may indicate that msi is substantially transmitted from the transmitter that the receiver recognizes.

Figure 4:
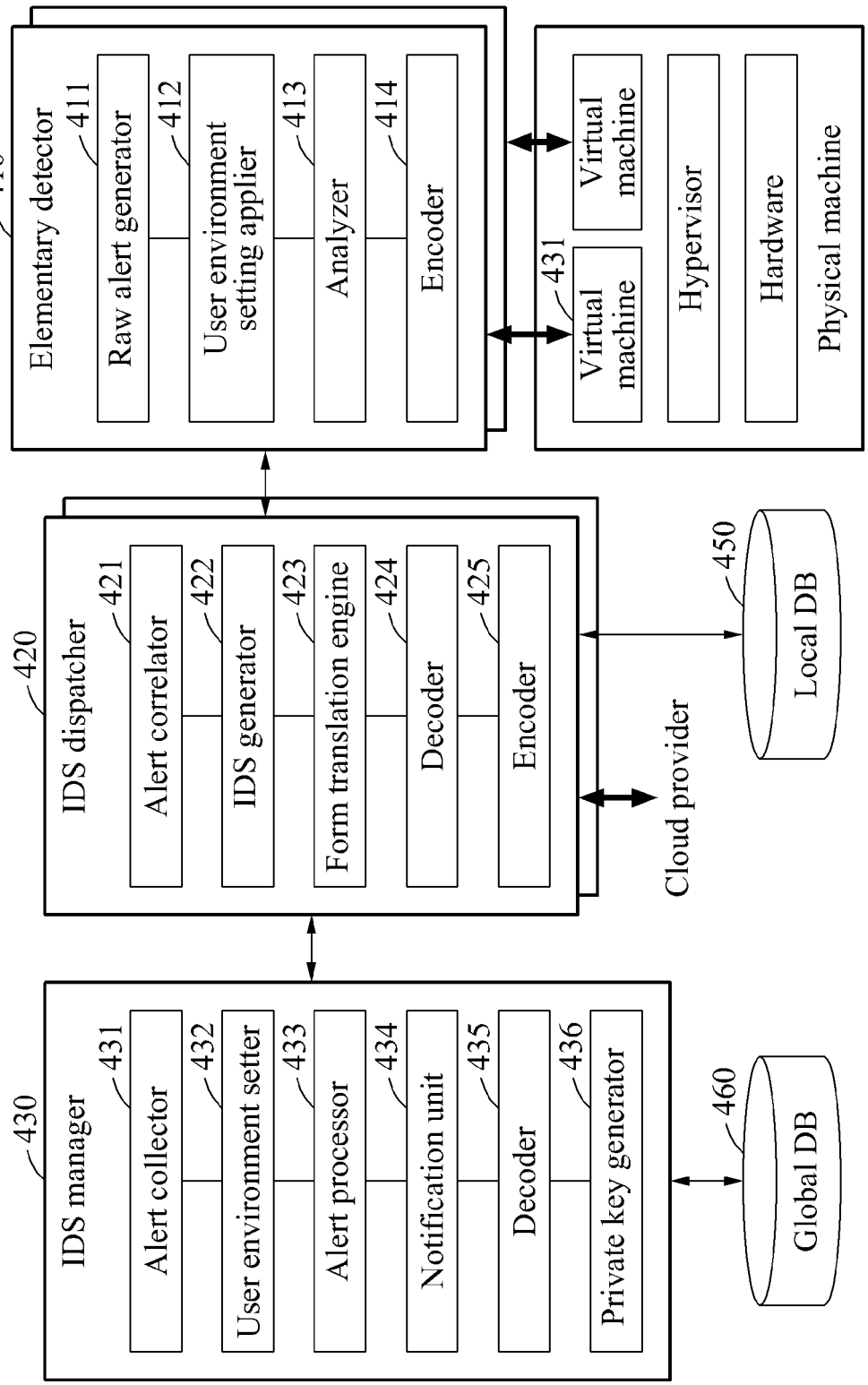
FIG. 4 is a block diagram illustrating a configuration of an intrusion detection system in a cloud computing service according to an embodiment.

FIG. 4 is a block diagram illustrating a configuration of an intrusion detection system in a cloud computing service according to an embodiment.

A hypervisor may generate a virtual machine 441 by virtualizing hardware. A plurality of virtual machines may be generated within a single physical machine by the hypervisor. The virtual machine 441 may be provided by the cloud computing service.

In the cloud computing service, an intrusion detection system 400 may include an elementary detector 410, an intrusion detection system (IDS) dispatcher 420, and an intrusion detection system (IDS) manager 430. The intrusion detection system 400 may prevent the occurrence of an intrusion in the cloud computing server.

The intrusion detection system 400 may provide an encryption and decryption function.

Other configurations in addition to the above configuration may be included in the intrusion detection system 400 of the cloud computing service. Hereinafter, constituent elements of the intrusion detection system 400 in the cloud computing service will be described in detail.

The elementary detector 410 may monitor the virtual machine 441 of the user. The elementary detector 410 may be disposed within the virtual machine 441 in order to monitor the virtual machine 441. For example, the elementary detector 410 may be a physical machine 440, in which the virtual machine 441 operates. Alternatively, the elementary detector 410 may operate as a process within the virtual machine 441. Alternatively, the elementary detector 410 may be the physical machine 440, for example, the local DB 450, to execute a process of monitoring the virtual machine 441.

The elementary detector 410 may use an anomaly detection scheme.

The elementary detector 410 may include a raw alert generator 411, a user environment setting applier 412, and an analyzer 413. The elementary detector 410 may further include an encoder 414.

The elementary detector 410 may collect and analyze a computing state value. For example, the computing state value may include an amount of memory used, a usage rate of a central processing unit (CPU), a total amount of network traffic, an intrusion detection ID, and the like. The computing state value may be a state value of the virtual machine 441 monitored by the elementary detector 410. The computing state value may be a predetermined portion of computing state values that may be collected and be analyzed for performance of the intrusion detection system 400.

The virtual machine 441 of the user may transmit a state value of the virtual machine 441 to the elementary detector 410. The state value of the virtual machine 441 may include a state value with respect to network traffic, a system memory, a system file, a system log, and the like. The elementary detector 410 may collect and analyze the transmitted state value. The above transmission may be performed in real time or periodically.

The user may set a threshold of the elementary detector 410 associated with the virtual machine 441 of the user, and may add or remove an intrusion detection function of the elementary detector 410. Here, setting of the threshold may be setting of a user environment about the elementary detector 410. The IDS dispatcher 420 may set the user environment about the elementary detector 410, and may configure a function of the elementary detector 410.

A range of the threshold settable by the user may be limited to be within a predetermined range that a service provider of the cloud computing service may provide the user of the virtual machine 441. The IDS manager 430 may limit the range of the user environment setting.

A raw alert may be an alert generated by the elementary detector 410. The raw alert may be generated based on a result of monitoring the virtual machine 441. The elementary detector 410 may generate the raw alert when a traffic value of the virtual machine 441 of the user exceeds the threshold. The raw alert may include a supercritical value. The supercritical value may indicate a level at which the traffic value of the virtual machine 441 exceeds the threshold. The raw alert may include the aforementioned state value of the virtual machine 441.

The raw alert may be stored in the local DB 450 in a general form such as an intrusion detection message exchange form (IDMEF). The raw alert may be provided to determine occurrence of an intrusion. The occurrence of the intrusion may not be determined based on the raw alert alone. The raw alert may be transmitted from the elementary detector 410 to the IDS dispatcher 420 for accurate and detailed analysis.

The analyzer 413 may determine whether the traffic value of the virtual machine 441 exceeds the threshold.

The user environment setting applier 412 may apply a user environment variable of the IDS manager 430 to the virtual machine 441. The user environment variable may include the threshold.

The raw alert generator 411 may generate the raw alert. When the traffic value is determined to exceed the threshold, the raw alert generator 411 may generate the raw alert. The raw alert may include the state value of the virtual machine 441 and the supercritical value.

When the elementary detector 410 is generated, the encoder 414 may receive a unique ID of the elementary detector 410 that is generated by the IDS dispatcher 420 for authentication of the elementary detector 410. Also, for encryption, the encoder 414 may receive an ID of the IDS dispatcher 420. The ID of the IDS dispatcher 420 may be used as a public key of the IDS dispatcher 420.

When a traffic value of a network exceeds the threshold, the encoder 414 may encrypt the raw alert using the ID of the IDS dispatcher 420. An intrusion detection ID, the supercritical value, and the state value of the virtual machine 441 may be included in the raw alert.

To guarantee performance of the virtual machine 441, the encoder 414 may encrypt the raw alert using a maximally light ID based encryption scheme. Since the ID of the IDS dispatcher 420 is a public key, the raw alert may be encrypted using the ID of the IDS dispatcher 420.

The IDS dispatcher 420 may determine the occurrence of the intrusion. When the intrusion occurs, the IDS dispatcher 420 may transmit a hyper alert to the IDS manager 430. The hyper alert may include suspected data in association with the intrusion. The hyper alert may include accumulated raw alerts.

The IDS dispatcher 420 may generate and manage the elementary detector 410 configured for each virtual machine 441. The IDS dispatcher 420 may be present in a cloud area. According to a cloud policy, a plurality of IDS dispatchers may be configured.

The IDS dispatcher 420 may determine the occurrence of the intrusion by comparing the raw alert with a blacklist within the local DB 450. When the state value of the virtual machine 441 of the raw alert is similar or identical to the blacklist within the local database 450, the IDS dispatcher 420 may determine that the intrusion has occurred. The blacklist may include a known attack pattern and an attack pattern prepared by an intrusion manager. When it is determined that the intrusion has occurred, the IDS dispatcher 420 may transmit the hyper alert to the IDS manager 430.

The IDS dispatcher 420 may include an alert correlator 421, an IDS generator 422, and a form translation engine 423. The IDS dispatcher 420 may further include a decoder 424 and an encoder 425.

The IDS dispatcher 420 may be operated as an independent server or management system to manage a cloud server. The IDS dispatcher 420 may store an IDS manager ID for encryption. In the case of generating and adding of the IDS dispatcher 420, an IDS manager ID for encryption may be stored within the IDS dispatcher 420.

The IDS generator 422 may generate the elementary detector 410. The IDS generator 422 may generate the elementary detector 410 to monitor the virtual machine 441. The IDS generator 422 may generate the elementary detector 410 within the virtual machine 441. The IDS generator 422 may manage the generated elementary detector 410.

The IDS generator 422 may generate and manage the elementary detector 410 based on a threshold set by the user. Here, setting of the threshold may be setting of a user environment about the elementary detector 410.

The form translation engine 423 may convert, to be in an IDMEF, the raw alert and the state value transmitted from the elementary detector 410. The form translation engine 423 may store, in the local DB 450, the raw alert and the state value that are converted to be in the IDMEF.

The raw alert may be uni-directionally transmitted. For example, the raw alert may be transmitted from the elementary detector 410 to the form translation engine 423.

The alert correlator 421 may generate the hyper alert by associating intrusion information and a state value of the virtual machine 441 with the raw alert. The intrusion information may include a location at which an attack against the virtual machine 441 has occurred and a pattern of the attack. The alert correlator 421 may transmit the generated hyper alert to the IDS manager 430.

The alert correlator 421 may compare the raw alert with the blacklist within the local DB 450, and may determine that the intrusion has occurred when the raw alert is similar or identical to the blacklist. Here, the state value and the threshold in the raw alert may be used for comparison.

The alert correlator 421 may determine a suspected signal or attack by correlating the raw alert and the blacklist. To notify a security manager or a user about the suspected signal or attack, the alert correlator 421 may transmit the hyper alert to the IDS manager 430. Specifically, the alert correlator 421 may transmit the hyper alert to the IDS manager 430 in order to clearly verify whether the suspected signal is an attack by comparing each of raw alerts received from a plurality of virtual machines or clouds with the blacklist. For example, since only a state value of the virtual machine 441 is known, the intrusion detection system 400 may verify whether the suspected signal is an attack through the IDS manager 430. The IDS manager 430 may determine whether an intrusion attack has occurred by comparing each of the plurality of raw alerts with the blacklist.

To identify a fake elementary detector and authenticate the elementary detector 410, the IDS dispatcher 420 may store an IDS manager ID. An elementary detector ID assigned to the elementary detector 410 when the elementary detector 410 is generated may be an IDS manager ID. Alternatively, the elementary detector ID may be generated based on the IDS manager ID.

When the IDS manager ID is modified, the IDS dispatcher 420 may retransmit, to the elementary detector 410, the elementary detector ID that is updated based on the above modification. The elementary detector 410 may store the updated elementary detector ID.

The IDS dispatcher 420 may perform decryption of the encrypted raw alert. The IDS dispatcher 420 may authenticate the elementary detector 410 by comparing the elementary detector ID included in the raw alert with the IDS manager ID.

The decoder 424 may perform decryption of the encrypted raw alert that is generated by the encoder 414 of the elementary detector 410. For the above decryption, the decoder 424 may request a private key generator 436 of the IDS manager 430 for a private key. To make a request for the private key, the decoder 424 may transmit an IDS dispatcher ID to the private key generator 436. The private key generator 436 may generate a private key based on the IDS dispatcher ID. The private key generated by the private key generator 436 may be transmitted to the decoder 424.

The decoder 424 may perform decryption of the encrypted raw alert using the transmitted private key. The decoder 424 may authenticate the elementary detector 410 and the transmitted raw alert by comparing the elementary detector ID included in the decrypted raw alert with the IDS manager ID.

The decoder 424 may transmit the authenticated raw alert to the form translation engine 423. The form translation engine 423 may store the transmitted raw alert in the local DB 450. The alert correlator 421 may compare the raw alert stored in the local DB 450 with an intrusion pattern.

The encoder 425 may generate an encrypted hyper alert by encrypting the hyper alert generated by the IDS dispatcher 420 and the IDS dispatcher ID. The encoder 425 may transmit the encrypted hyper alert to the IDS manager 430. The hyper alert may include information about an attack pattern associated with accumulated raw alerts and information about a suspected attack pattern.

The number of elementary detectors 410 and the number of virtual machines 441 may be plural. The IDS manager 430 may receive raw alerts of the elementary detectors of a plurality of cloud providers. The IDS manager 430 may store the received raw alerts in a global DB 460. When the hyper alert of the IDS dispatcher 420 is similar or identical to the blacklist of the global DB 460, the IDS manager 430 may determine that the intrusion has occurred. When it is determined that the intrusion has occurred, the IDS manager 430 may notify intrusion detection.

The IDS manager 430 may compare the hyper alert of the IDS dispatcher 420 positioned in each of the plurality of cloud providers and the raw alert with the blacklist of the global DB 460, may determine the occurrence of the intrusion based on the above comparison, and may notify the intrusion detection when the intrusion is determined to have occurred.

Based on a usage purpose of a cloud service, the user may set a threshold and a function of the elementary detector 410 generated in the virtual machine 401. The threshold and the function may be set within an allowable range. The IDS manager 430 may set the threshold and the function of the elementary detector 410.

The IDS manager 430 may store intrusion detection alerts and intrusion detection information of the plurality of cloud providers in the global DB 460.

The IDS manager 430 may include an alert collector 431, a user environment setter 432, an alert processor 433, and a notification unit 434. The IDS manager 430 may further include a decoder 435 and the private key generator 436. The IDS manager 430 may store the IDS manager ID.

The user environment setter 432 may set a user environment variable based on a usage purpose of the cloud service. The user environment variable may include the threshold of the elementary detector 410.

The alert collector 431 may receive all of the alerts occurring in coverage of the cloud server, and may store the received alerts in the global DB 460.

The alert processor 433 may generate a blacklist by analyzing alerts stored in the global DB 460 and may determine the occurrence of the intrusion.

When the information processor 433 determines that the intrusion has occurred, the notification unit 434 may notify the user and the manager about the intrusion detection.

Based on the usage purpose of the cloud service of the user, the user environment setter 432 may set the threshold and the function of the elementary detector 410 generated in the virtual machine 441.

The alert processor 433 may compare the transmitted hyper alert with the blacklist of the global DB 460, and may determine that the alert has occurred when the hyper alert is similar or identical to the blacklist.

When the IDS dispatcher 420 does not determine that the intrusion has occurred and thereby the hyper alert is absent, the alert processor 433 may compare each of the raw alerts occurring in the plurality of clouds with the blacklist within the global DB 460. When the raw alert is similar or identical to the blacklist, the IDS dispatcher 420 may determine that the intrusion has occurred.

When the hyper alert is transmitted, the alert processor 433 may initially determine whether the intrusion has occurred based on the raw alert, the hyper alert, and the blacklist stored in the global DB 460.

The alert collector 431 may receive all of the alerts occurring in coverage of a cloud server, and may store the received alerts in the global DB 460 so that the alert processor 433 may process the received alerts.

When the alert processor 433 determines that a new intrusion has occurred, the notification unit 434 may add an intrusion pattern of the intrusion to the existing blacklist and may store, in the global DB 460, the blacklist in which the intrusion pattern is added. The notification unit 434 may transmit the blacklist in which the intrusion pattern is added, to each of the IDS dispatchers 420. The notification unit 434 may create a list associated with the intrusion. In response to a request from the user, the notification unit 434 may provide the list to the user.

When the alert processor 433 determines that the alert has occurred, the notification unit 434 may notify the user and the manager about the intrusion detection.

The IDS manager 430 may store the IDS dispatcher ID and elementary detector IDs of the elementary detectors.

Raw alerts generated in the elementary detectors 410 may be transmitted to the IDS manager 430. For authentication of a raw alert, the IDS manager 430 may store and manage an elementary detector ID.

When the IDS dispatcher 420 is added, the IDS manager 430 may assign an IDS dispatcher ID to the IDS dispatcher 420. The IDS manager 430 may perform decryption and authentication of a hyper alert.

The IDS manager 430 is aware of elementary detector IDs of the elementary detectors 410. Therefore, the decoder 435 may perform decryption of the encrypted raw alert using the elementary detector ID of the elementary detector ID and the encryption key. The decoder 435 may perform decryption of the encrypted hyper alert that is generated by the encoder 425 of the IDS dispatcher 420, using the IDS manager ID and the private key generator 436. After performing decryption, the decoder may perform authentication of the raw alert and the hyper alert.

The private key generator 436 may generate a private key corresponding to an ID. When a request including the ID is received from a node, the private key generator 436 may generate the private key corresponding to the ID and may transmit the generated private key to the node.

The private key generator 436 may perform the same functionality as a key generator of IBE. The private key generator 436 may generate the private key corresponding to the ID of the node and may provide the generated private key to the not having made a request for the private key.

The number of IDS managers 430 and the number of local DBs 450 may be plural. Each of the plurality of cloud providers may operate the IDS manager 430 and the local DB 450.

Figure 5:
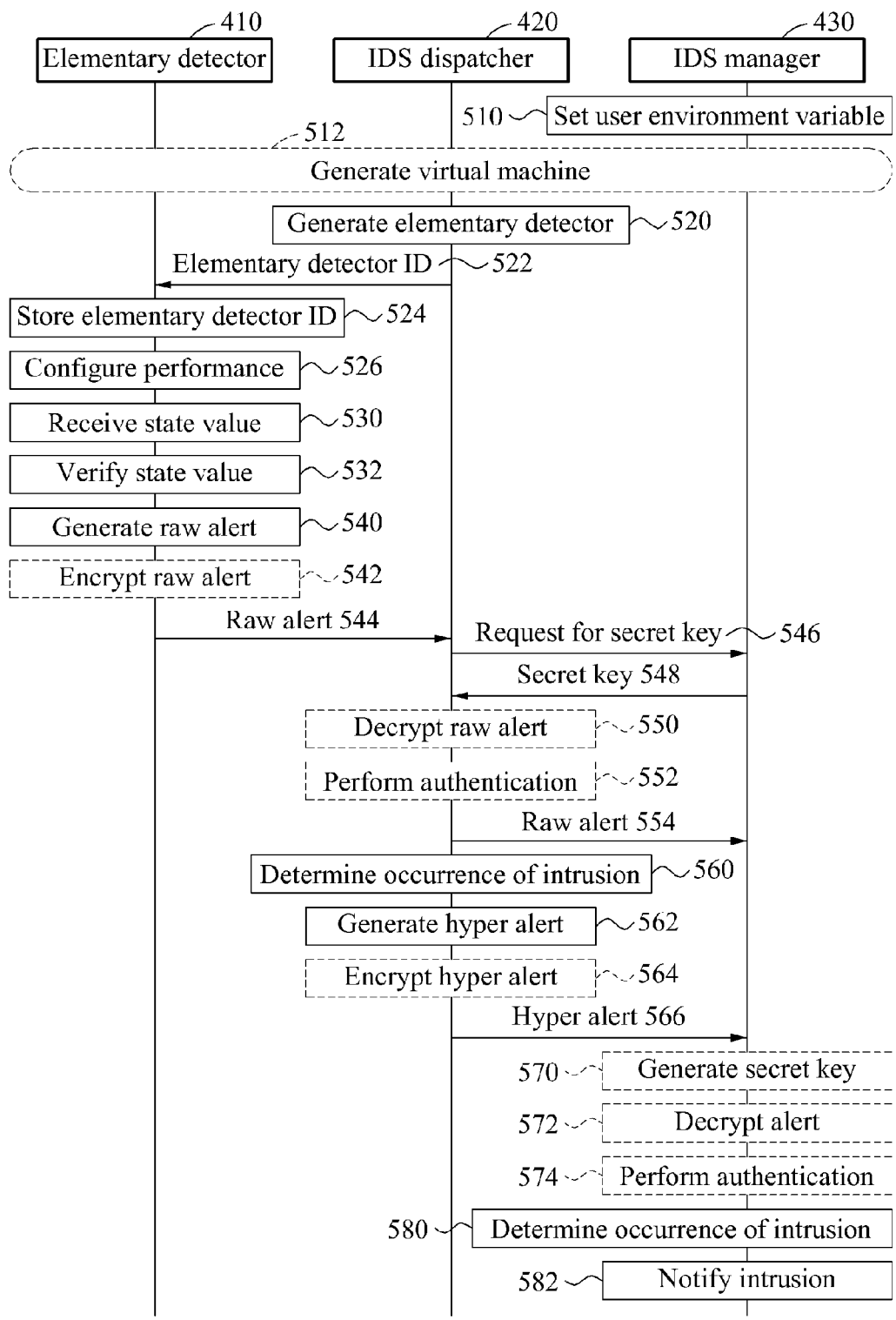
FIG. 5 is a flowchart illustrating an intrusion detection method according to an embodiment.

FIG. 5 is a flowchart illustrating an intrusion detection method according to an embodiment.

In operation 510, the user environment setter 432 of the IDS manager 430 may set a user environment variable based on a usage purpose of a cloud service. The user environment variable may include a threshold of the elementary detector 410.

When a user signs up for the cloud service, the user may set the user environment variable that includes the threshold of the elementary detector 410.

In operation 512, the virtual machine 441 to provide the user with the cloud service may be generated.

In operation 520, the IDS generator 422 of the IDS dispatcher 420 may generate the elementary detector 410. When the virtual machine 441 is generated, the IDS generator 422 may use a predetermined computing resource.

In operation 522, the IDS generator 422 may assign an elementary detector ID to the generated elementary detector 410.

In operation 524, the elementary detector 10 may store the assigned elementary detector ID. The elementary detector ID may be used for encrypted communication.

In operation 526, the user environment setting applier 412 of the elementary detector 410 may configure performance of the elementary detector 410. The user environment setting applier 412 may configure the performance of the elementary detector 410 based on the threshold, addition and deletion of an intrusion detection function, and the like.

In operation 530, the virtual machine 441 may transmit a state value of the virtual machine 441 to the elementary detector 410. The transmission may be transmitted in real time or periodically.

In operation 532, the analyzer 413 of the elementary detector 410 may determine whether a traffic value of the virtual machine 441 exceeds the threshold by verifying the transmitted state value.

When the analyzer 413 determines that the traffic value exceeds the threshold, the following operations may be continuously performed.

When the analyzer 413 determines that the traffic value exceeds the threshold, the raw alert generator 411 of the elementary detector 410 may generate a raw alert in operation 540.

The raw alert generated in operation 540 includes a supercritical value and the state value of the virtual machine 441 and thus, encryption may be required. In operation 542, the encoder 414 may generate an encrypted raw alert by encrypting the raw alert using an ID of the IDS dispatcher 420.

In operation 544, the raw alert generator 411 or the encoder 414 may transmit the raw alert to the IDS dispatcher 420. The raw alert may be the encrypted raw alert.

The IDS dispatcher 420 may receive the raw alert. When the received raw alert is the encrypted raw alert, the following operations 546, 548, 550, and 552 may be performed.

The encrypted raw alert may be encrypted using an IDS dispatcher ID. In operation 546, the IDS dispatcher 420 may request the private key generator 436 of the IDS manager 430 for a private key in order to decrypt the raw alert. The IDS dispatcher 420 may request the private key generator 436 for authenticating the elementary detector 410. The IDS dispatcher 420 may request the private key generator 436 for the private key using the IDS dispatcher ID.

In operation 548, the private key generator 436 may transmit, to the IDS dispatcher 420, the private key that is generated based on the IDS dispatcher ID.

In operation 550, the decoder 424 of the IDS dispatcher 420 may decrypt the encrypted raw alert using the received private key.

In operation 552, the IDS dispatcher 420 may authenticate the elementary detector 410 by comparing the elementary detector ID included in the raw alert with the IDS manager ID.

When the elementary detector ID included in the raw alert is a fake elementary detector ID, the IDS dispatcher 420 may notify a hypervisor or the virtual machine 441 that the fake elementary alert is found. The IDS dispatcher 420 may take an action associated with the fake elementary alert with respect to the hypervisor or the virtual machine 441.

In operation 554, the IDS dispatcher 420 may transmit the raw alert to the IDS manager 410. The raw alert transmitted to the IDS manager 410 may be the encrypted raw alert. The encoder 425 of the IDS dispatcher 420 may perform encryption of the raw alert. The above transmission may be performed periodically.

In operation 560, the IDS dispatcher 420 may determine the occurrence of the intrusion by analyzing data of the raw alert. The raw alert may be an accumulated raw alert. The IDS dispatcher 420 may compare the raw alert with a blacklist of the local DB 450. When the raw alert is similar or identical to the blacklist, the IDS dispatcher 420 may determine that the intrusion has occurred. Here, the state value and the state threshold included in the raw alert may be used for the comparison.

When it is determined that the intrusion has occurred, the IDS dispatcher 420 may generate a hyper alert in operation 562.

In operation 564, the encoder 425 may perform encryption of the hyper alert using an IDS manager ID.

In operation 566, the IDS dispatcher 420 may transmit the hyper alert to the IDS manager 430. The hyper alert may be an encrypted hyper alert.

In operation 570, the IDS manager 430 may generate a first private key for decrypting the encrypted raw alert and a second private key for decrypting the encrypted hyper alert. The IDS manager 430 may request the private key generator 436 for generating the first private key and the second private key. For the above request, the IDS manager 430 may transmit the IDS dispatcher ID and the IDS manager ID to the private key generator 436. The private key generator 436 may generate the first private key based on the IDS dispatcher ID, and may generate the second private key based on the IDS manager ID. The private key generator 436 may transmit the generated first private key and second private key to the IDS manager 430.

In operation 572, the decoder 435 of the IDS manager 430 may perform decryption of the encrypted raw alert using the first private key. The decoder 435 may perform decryption of the encrypted hyper alert using the second private key.

In operation 574, the IDS manager 430 may perform authentication of the raw alert and authentication of the hyper alert. The IDS manager 430 may authenticate the elementary detector 410 by comparing the IDS manager ID included in the raw alert with the IDS manager ID stored in the IDS manager 430. The IDS manager 430 may authenticate the IDS dispatcher 420 by comparing the IDS manager ID included in the hyper alert with the IDS manager ID stored in the IDS manager 430.

In operation 580, the IDS manager 430 may determine the occurrence of the intrusion. The IDS manager 430 may compare the hyper alert of the IDS dispatcher 420 positioned in each of a plurality of cloud providers and the raw alert with the blacklist of the global DB 460, and may determine the occurrence of the intrusion based on the above comparison.

Also, when the IDS dispatcher 420 does not determine that the intrusion has occurred and thereby, the hyper alert is absent, the alert processor 433 may compare the raw alert with the blacklist of the global DB 460, and may determine the occurrence of the intrusion based on the above comparison.

When the alert processor 433 determines that the intrusion has occurred, the alert processor 433 may inform the notification unit 434 that the intrusion has occurred.

The alert processor 433 may compare the transmitted hyper alert with the blacklist of the global DB 460, and may determine that the intrusion has occurred when the hyper alert is similar or identical to the blacklist.

When the IDS dispatcher 420 does not determine that the intrusion has occurred and thereby, the hyper alert is absent, the alert processor 433 may compare each of the raw alerts occurring in the plurality of clouds with the blacklist of the global DB 460. When the raw alert is similar or identical to the blacklist, the IDS dispatcher 420 may determine that the intrusion has occurred.

The alert collector 431 may receive all of the alerts occurring in coverage of a cloud server, and may store the received alerts in the global DB 460. The alert collector 431 may receive the raw alert and the hyper alert transmitted from the IDS dispatcher 420 or the IDS manager 430. The alert collector 431 may store the collected raw alert and hyper alert in the global DB 460 to be available by the alert processor 433.

In operation 582, when the alert processor 433 determines that the intrusion has occurred, the notification unit 434 may notify the user and the manager about the intrusion detection.

When the alert processor 433 determines that a new intrusion has occurred, the notification unit 434 may add an intrusion pattern of the intrusion to the existing blacklist and may store, in the global DB 460, the blacklist in which the intrusion pattern is added. The notification unit 434 may transmit the blacklist with the added intrusion pattern to each of the IDS dispatchers 420.

The embodiments may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

The embodiments may include computer-readable media including program instructions to implement various operations embodied by a computer. In particular, the embodiments may include computer-readable media with recorded programs including a content display code for displaying digital content on a screen of a touch sensing display, an object recognition code for recognizing an object selected by a user from digital content in response to a touch input of the user on the touch sensing display, an annotation storage code for generating and storing annotation data in which annotation is applied to an object in response to a user request, an annotation count code for counting the number of items of annotation data generated for each item in which description of the digital content is classified, and an annotation providing code for providing the number of items of annotation data for each item in response to a user request. A program according to the embodiments may include a PC based program a mobile terminal dedicated application, for example, a smart phone application, a picture phone virtual machine, and the like. The program may be stored in a memory of a user terminal and/or an e-book service system and thereby be executed by at least one processor that is driven in the user terminal and/or the e-book service system.

The media may also include, alone or in combination with the program instructions, data files, data structures, and the like. The media and program instructions may be those specially designed and constructed for the purposes of the embodiments, or they may be of the kind well-known and available to those having skill in the computer software arts. Also, the file system may be recorded in the computer-readable media.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An intrusion detection system of a cloud computing service, the system comprising:
   one or more processors;
   a network interface coupled to the one or more processors; and
   a non-transitory memory coupled to the one or more processors, wherein the one or more processors are configured to:
   generate an elementary detector to monitor a virtual machine provided by the cloud computing service, wherein the elementary detector comprises a raw alert generator and an encoder, wherein the elementary detector is configured to:
   generate, using the raw alert generator, a raw alert based on a result of the monitoring the cloud computing service, wherein the raw alert comprises a supercritical value and a state value of the virtual machine and wherein the supercritical value indicates a level at which a traffic value of the virtual machine exceeds a threshold, and,
   encrypt, using the encoder, the raw alert containing the intrusion information; and
   generate an intrusion detection system (IDS) dispatcher, the IDS dispatcher comprising a decoder and an alert correlator, wherein the IDS dispatcher is configured to:
   decrypt, using the decoder, the encrypted raw alert; and,
   determine, using the alert correlator, an occurrence of an intrusion into the cloud computing service based on the decrypted raw alert.

2. The system of claim 1, wherein the elementary detector generates the raw alert when the traffic value of the virtual machine exceeds the threshold.

3. The system of claim 2, wherein the threshold is limited to be within a constraint range that is set as a range that a service provider of the cloud computing service is capable of providing a user of the virtual machine.

4. The system of claim 1, wherein the IDS dispatcher determines the occurrence of the intrusion by comparing the raw alert with a blacklist.

5. The system of claim 4, wherein the blacklist is stored in a local database of the IDS dispatcher.

6. The system of claim 4, wherein the blacklist includes a known attack pattern and an attack pattern prepared by a manager.

7. The system of claim 1, wherein the IDS dispatcher generates the elementary detector that is configured for each virtual machine.

8. The system of claim 1, wherein the elementary detector uses an anomaly detection scheme.

9. The system of claim 1, wherein:
a plurality of virtual machines and a plurality of elementary detectors are provided, and
the IDS dispatcher receives the raw alert from the plurality of elementary detectors.

10. The system of claim 1, further comprising:
an intrusion detection system (IDS) manager to determine the occurrence of the intrusion based on a hyper alert,
wherein the IDS dispatcher generates the hyper alert by correlating intrusion information and the state value of the virtual machine with the raw alert.

11. The system of claim 10, wherein the intrusion information includes a location at which an attack against the virtual machine has occurred and a pattern of the attack.

12. The system of claim 10, wherein the IDS manager determines that the intrusion has occurred when the hyper alert is similar or identical to an intrusion pattern in a blacklist.

13. A computer-implemented intrusion detection method of a cloud computing service, the method comprising:
generating by a first processor a raw alert based on a result of monitoring a virtual machine provided by the cloud computing service, wherein the raw alert comprises a supercritical value and a state value of the virtual machine, and wherein the supercritical value indicates a level at which a traffic value of the virtual machine exceeds a threshold;
encrypting, by the first processor, the raw alert containing the intrusion information using an encoder;
decrypting, by a second processor, the raw alert containing the intrusion using a decoder; and
determining, by the second processor, an occurrence of an intrusion into the cloud computing service based on the decrypted raw alert.

14. The method of claim 13, wherein the raw alert is generated when the traffic value of the virtual machine exceeds the threshold.

15. The method of claim 13, wherein the determining comprises determining the occurrence of the intrusion by comparing the raw alert with a blacklist.

16. The method of claim 15, wherein the blacklist includes a known attack pattern and an attack pattern prepared by a manager.

17. The method of claim 15, further comprising:
determining the occurrence of the intrusion based on a hyper alert, wherein the hyper alert is generated by associating intrusion information and the state value of the virtual machine with the raw alert.

18. The method of claim 17, wherein the intrusion information includes a location at which an attack against the virtual machine has occurred and a pattern of the attack.

* * * * *